F. A. SPENCER.
AUTOMOBILE JACK.
APPLICATION FILED JULY 15, 1912.
1,113,063.
Patented Oct. 6, 1914.
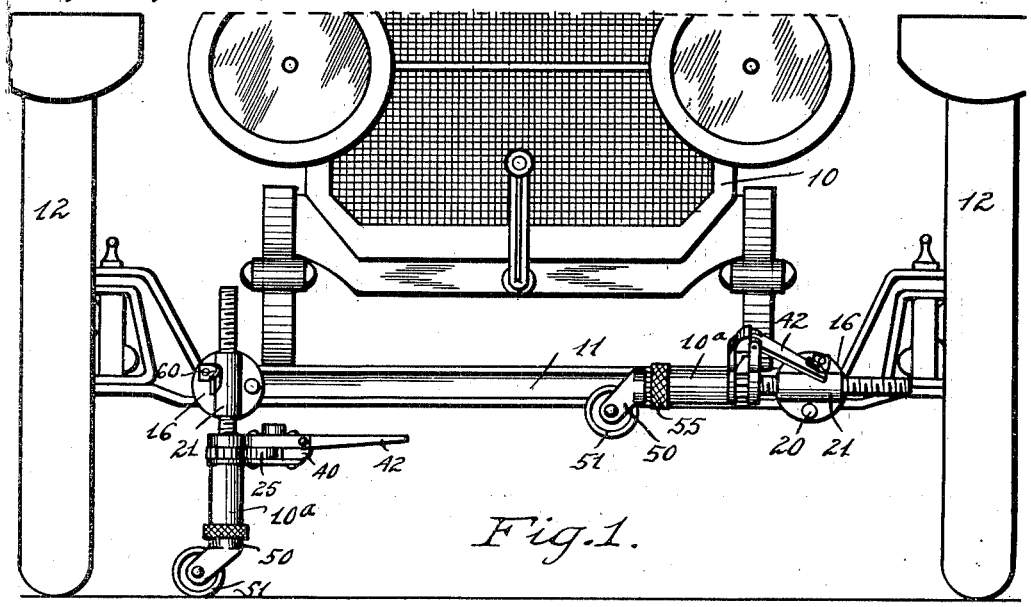
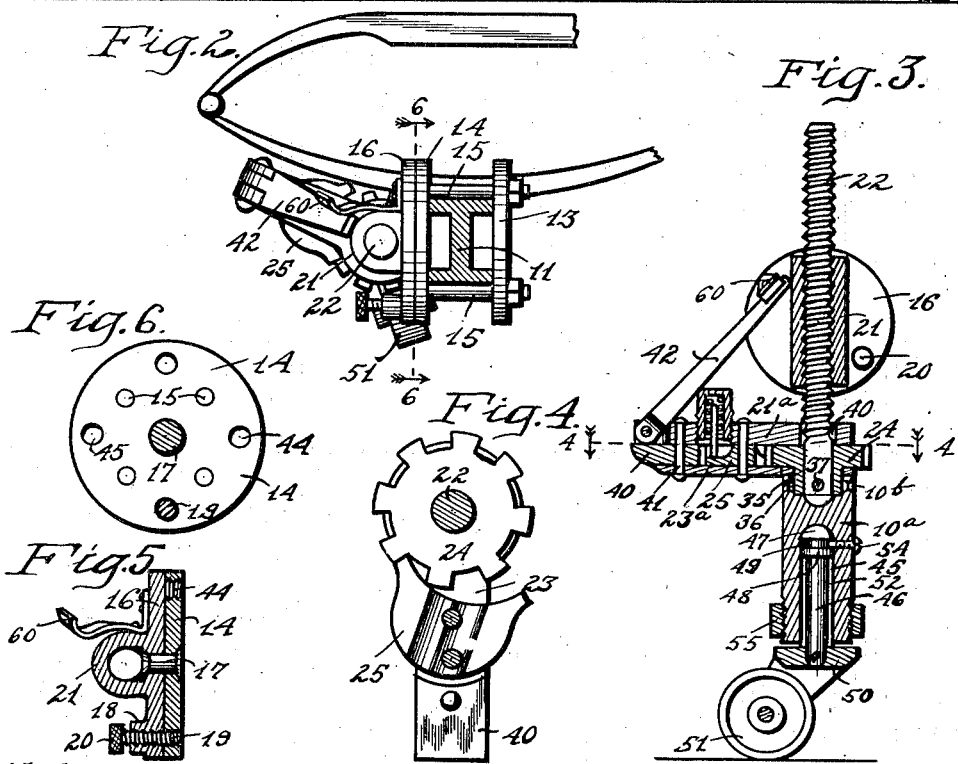
Witnesses:
W. A. Loftus
A. G. Hague
Inventor:
Franklin A. Spencer.
by Orwig & Bair attys

UNITED STATES PATENT OFFICE.

FRANKLIN A. SPENCER, OF DES MOINES, IOWA.

AUTOMOBILE-JACK.

1,113,063.

Specification of Letters Patent. Patented Oct. 6, 1914.

Application filed July 15, 1912. Serial No. 709,833.

*To all whom it may concern:*

Be it known that I, FRANKLIN A. SPENCER, a citizen of the United States, residing at Des Moines, in the county of Polk and State of Iowa, have invented a certain new and useful Automobile-Jack, of which the following is a specification.

The object of my invention is to provide an automobile jack of simple, durable and inexpensive construction, which is designed to be mounted and carried on the axle of an automobile, upon which the vehicle may be readily moved about.

A further object is to provide such a jack, which may be swung to position where it will be out of the way when it is not in use and easily and readily secured in such position.

A further object is to provide an automobile jack of the kind mentioned, provided with a hinged lever handle which may be folded over against the jack proper in such position that it cannot swing downwardly or be in the way when the jack is in its raised position.

A further object is to provide such a jack which may be readily and easily released from its raised position and dropped to position for raising the car thereon, and provided with a hinged handle which will stand in proper position for use when the jack is lowered, and with means for securing said handle against movement when the jack is in its raised position.

My invention consists in certain details, in the construction, arrangement and combination of the various parts of my device, whereby the objects contemplated are attained, as hereinafter more fully set forth, pointed out in my claim, and illustrated in the accompanying drawings, in which—

Figure 1 shows a front elevation of an automobile showing two of my jacks installed on the axle, one of them being in its raised position and the other being in its lowered position and ready for use. Fig. 2 shows a detail, sectional, view of the said axle with my device thereon, taken from the side of the automobile. Fig. 3 shows a central, vertical section through my improved automobile jack. Fig. 4 shows a detail, sectional view of the ratchet. Fig. 5 shows a central, transverse, vertical, sectional view through the plate which is designed to be secured to the axle and the plate on which the jack proper is mounted. Fig. 6 shows a detail view of the face of the plate which is secured to the axle.

In the accompanying drawing I have used the reference numeral 10 to indicate generally the body of an automobile. I have shown a front axle 11 and front wheels 12 mounted thereon.

My improved automobile jack is designed to be mounted on the axle and to be carried there although it may be readily detached when desired. On one side of the axle I provide a plate 13 extending above and below the axle. On the opposite side I provide a similar plate 14. Above and below the axle are a number of bolts 15, whereby the plates 14 and 13 are secured together, and mounted on the axle. It will be understood that the adjacent surfaces of the plates 13 and 14 may be of any suitable shape to fit the axle and that the outer surface of the plate 14 is smooth and flat. A similar plate 16 is rotatably mounted adjacent to the forward face of the plate 14 by means of a bolt 17 which extends through the plates 14 and 16. The bolt 17 is preferably provided with a head and a nut which are countersunk respectively in the inner surface of the plate 14 and the outer surface of the plate 16. The plate 16 is designed to rotate freely on the bolt 17. Formed on the outer surface of the plate 16 is a lug 18. Extending through the lug 18 and through the plate 16 is an opening in which is mounted a screw 19 on which is a head 20. The use of the screw 19 will be hereinafter more fully described. Formed on the outer surface of the plate 16 and preferably extending across the center thereof, is an elongated lug or bearing 21 which is internally screwthreaded.

Extended through the internally screwthreaded bearing 21 is a screwthreaded rod 22. On the lower end of the rod 22 is fixed a ratchet wheel 24 having a downwardly extending portion 35. Below the ratchet 24 is a cylinder 10ª in the upper end of which is formed a socket to receive the lower portion of the extension 35 and the lower end of the rod 22. For operating the ratchet 24 and thereby rotating the rod 22, I have provided a pawl and lever similar in construction to the ratchet and pawl described in my application for patent, Serial No. 702,106, filed June 6, 1912. An arm 21ª is provided with an opening 40 which turns freely on the rod 22 and is mounted thereon just above the ratchet 24. An arm 23ª is rotatably mounted on the downward extension 35 between the ratchet 24 and the cylinder 10ª. The ratchet 24 and the rod 22 are secured together and are rotatably mounted in the upper end of the cylinder 10ª by means of a pin 37 which extends through the rod 22 and through the extension 35 on each side of the rod 22. Each end of the pin 37 is received in an internal annular groove 36 in the socket in the upper end of the cylinder 10ª, being originally inserted through the opening 10ᵇ.

At their outer ends, the arms 23ª and the arm 21ª are held spaced apart by a block 40. A bolt 41 secures the arms 23ª and 21ª and the block 40 together. Pivotally mounted between the arms 23ª and 21ª and adjacent to the ratchet 24 is a pawl 25, constructed similar to the pawl in my former application hereinbefore identified. Pivoted to the outer end of the arm 21ª to swing in a vertical plane when my jack is in its lowered position, is a lever arm 42. The downward movement of the lever arm 42 is limited by the outer end of the block 40, as clearly shown in Fig. 3. On the outer surface of the plate 16 is a spring 60 for holding the lever arm in its folded position as hereinafter more fully described.

For securing the jack in its lowered or in its raised position, I have provided the following means: Mounted in the plate 16 is a thumb screw 19 hereinbefore described. In the plate 14 I have provided a screwthreaded opening 44 designed to receive the screw 19 when the jack is in its lowered position. When the screw 19 is not received in the opening 20, the jack may be swung to position parallel with the axle, as shown at the right hand side of Fig. 1. I have provided in the plate 14 a screwthreaded opening 45 to receive the screw 19. By screwing the screw 19 into the opening 45 when the jack is in its raised position, the jack may be secured in said position.

In the lower end of the cylinder 10ª is an upwardly extending cylindrical opening 45. Mounted in the opening 45 is a cylinder 46 on the upper end of which is a head 47 and just below the head 47 and slightly spaced apart therefrom is a shoulder 48. It will be seen that between the shoulder 48 and the head 47 is formed a groove 49. Fixed on the cylinder 46, below the cylinder 10ª is a bracket 50 in which is mounted a caster wheel 51. Surrounding the cylinder 46 in the opening 45 are roller bearings 52. Extending through one side of the cylinder 10ª into the groove 49, is a removable pin 54 by which the cylinder 46 is held in the opening 49. The lower end of the cylinder 10ª is externally screwthreaded and mounted on said lower end is a nut 55. By screwing the nut 55 downwardly against the bracket 50, said bracket may be locked against rotation. It will be noted that the bracket 50 is so constructed that the wheel 51 is mounted off center with relation to the cylinder 46. It will therefore appear that when the jack is in its raised position, as shown in Fig. 1, the wheel 51 may be turned downwardly and the lever handle 42 moved to position above the body of the jack and fastened beneath the spring 60 and the pawl 25 locked. The caster wheel may be locked against swivel movement by the nut 55. The lever arm will then be held in position and cannot rotate on account of the fact that the wheel 51 will engage the axle and resist any tendency of the lever arm to swing downwardly and forwardly.

My improved jack has the advantage of being permanently and yet detachably secured to the axle so that it is always installed in position for use. When not in use, it may be moved to its raised position, and be entirely out of the way. It may be quickly and easily dropped to its position for use and locked therein. The lever arm may be removed from the engagement with the spring 60 and moved to position for use. If my jacks are installed on both front and rear axle, the vehicle may be freely moved on them. The caster wheel 51 may be permitted a free swivel movement or may be locked against such movement.

A claim as my invention:

In a device of the class described, the combination of a vehicle axle, a plate provided with a pivot and a number of openings concentric with said pivot, means for securing said plate to said axle, a second plate mounted upon the pivot of the first mentioned plate, means for adjustably securing a jack to said second plate, and a screw threaded pin in said second plate to coact with the openings in the first plate to lock a jack in any one of a number of positions relative to the axle.

Des Moines, Iowa, July 6, 1912.

FRANKLIN A. SPENCER.

Witnesses:
BESSIE E. DEAL,
A. G. HAGUE.